(12) United States Patent
Lee et al.

(10) Patent No.: US 8,194,196 B2
(45) Date of Patent: Jun. 5, 2012

(54) LIQUID CRYSTAL DISPLAY DEVICE USING A MAGNETIC DRIVING FIELD AND DRIVING METHOD THEREOF

(75) Inventors: Don Gyou Lee, Gumi-si (KR); Jung Ho Kil, Gumi-si (KR); Do Yeon Kim, Busan (KR)

(73) Assignee: LG Display Co., Ltd., Seoul (KR)

( * ) Notice: Subject to any disclaimer, the term of this patent is extended or adjusted under 35 U.S.C. 154(b) by 302 days.

(21) Appl. No.: 11/019,532

(22) Filed: Dec. 23, 2004

(65) Prior Publication Data

US 2005/0243226 A1 Nov. 3, 2005

(30) Foreign Application Priority Data

Dec. 24, 2003 (KR) .................. 10-2003-0096715

(51) Int. Cl.
*G02F 1/133* (2006.01)
*G09G 3/18* (2006.01)
*G09G 3/36* (2006.01)

(52) U.S. Cl. ................. 349/23; 345/54; 345/96

(58) Field of Classification Search ............ 349/23, 349/141; 345/54, 96

See application file for complete search history.

(56) References Cited

U.S. PATENT DOCUMENTS

| | | | |
|---|---|---|---|
| 6,236,383 B1 * | 5/2001 | Nakajima et al. | 345/87 |
| 6,426,782 B1 * | 7/2002 | Nakajima | 349/23 |
| 2002/0057411 A1 * | 5/2002 | Kim et al. | 349/141 |

FOREIGN PATENT DOCUMENTS

| | | |
|---|---|---|
| CN | 1036843 | 11/1989 |
| CN | 1178919 A | 5/1998 |
| JP | 07064118 A * | 3/1995 |
| KR | 100389827 B1 | 6/2003 |

OTHER PUBLICATIONS

Communication from Korean Patent Office dated Nov. 16, 2005.

* cited by examiner

*Primary Examiner* — Mark Robinson
*Assistant Examiner* — Paisley L Arendt
(74) *Attorney, Agent, or Firm* — McKenna Long & Aldridge LLP

(57) ABSTRACT

A liquid crystal display device and a fabricating method thereof for driving the liquid crystal display device using a magnetic field are disclosed. In the device and method, a current is applied to a first electrode in a first direction, and a current is applied to a second electrode in a second direction. A liquid crystal layer is driven with a magnetic field induced by the currents from the first and second electrodes modulating a light.

4 Claims, 7 Drawing Sheets

LIQUID CRYSTAL DISPLAY DEVICE USING A MAGNETIC DRIVING FIELD AND DRIVING METHOD THEREOF

This application claims the benefit of Korea Patent Application No. P2003-96715 filed on Dec. 24, 2003, which is hereby incorporated by reference for all purposes as if fully set forth herein.

BACKGROUND OF THE INVENTION

1. Field of the Invention

The present invention relates to a liquid crystal display, and more particularly to a liquid crystal display device and a fabricating method thereof wherein the liquid crystal display device is driven with a magnetic field.

2. Description of the Related Art

Generally, a liquid crystal display (LCD) controls an electric field applied to a liquid crystal cell to modulate a light incident to the liquid crystal cell, thereby displaying a picture. The liquid crystal display may be largely classified as a vertical electric field system and a horizontal electric field system based on a direction of the electric field driving the liquid crystal.

The vertical electric field system includes an upper substrate and a lower substrate vertically opposed to each other along with a pixel electrode and a common electrode that are also vertically opposed to each other. In the vertical electric field system, an electric field is applied to the liquid crystal cell in a vertical direction by a voltage applied to the electrodes. The vertical electric field system has a drawback in that although it can assure a relatively wide aperture ratio, it has a narrow viewing angle. A typical liquid crystal mode of the vertical electric field system is a twisted nematic (TN) mode which is used for a majority of liquid crystal display devices.

As shown in FIG. 1A and FIG. 1B, the TN mode has liquid crystal molecules 13 positioned between the upper glass substrate 14 and the lower glass substrate 12. An upper polarizer 15 having a specific direction of light transmitting axis is attached onto a light output face of the upper glass substrate 14 while a polarizer 11 at a light transmitting axis perpendicular to the light transmitting axis of the upper polarizer 15 is attached onto a light incidence face of the lower glass substrate 12. Further, the TN mode has a transparent electrode provided at each of the upper glass substrate and the lower glass substrate, and an alignment film for establishing a pre-tilt angle of the liquid crystal.

Herein, operation of the TN mode will be described assuming it to be a normally white mode.

A local light axis (director) of the liquid crystal molecules is continuously twisted at 90 degrees between the upper glass substrate 14 and the lower glass substrate 12 at an inactive state in which a voltage is not applied to the upper glass substrate 14 and the lower glass substrate 12. During the inactive state, polarization characteristics of the line polarization input via the polarizer 11 of the lower glass substrate 12 is changed to fail to pass through the polarizer 15 of the upper glass substrate 14. On the other hand, during an active state in which a voltage is applied to the upper transparent electrode and the lower transparent electrode and an electric field is applied to the liquid crystal 13 by the voltage difference, a light axis of the center portion of the liquid crystal layer becomes parallel to the electric field and the twisted structure is released. A line polarization input via the polarizer 11 keeps its polarization characteristic as it is while going through the liquid crystal layer, and passes through the polarizer 15 of the upper glass substrate 14.

However, the TN mode has a drawback in that, since a contrast ratio and a brightness variation according to a viewing angle, it is difficult to realize a wide viewing angle.

A horizontal electric field system is an in plane switching (IPS) mode in which an electric field between the electrodes provided on the same substrate is formed and the liquid crystal molecules are driven with the electric field.

As shown in FIG. 2, in the IPS mode, a first metal electrode 21 and a second metal electrode 22 are provided in such a manner as to cross each other and an in plane driving of a liquid crystal 23 is made by an electric field applied between the metal electrodes 21 and 22, thereby realizing a wide viewing angle.

However, the IPS mode has a drawback in that it has a low aperture ratio due to the first and second metal electrodes 21 and 22.

SUMMARY OF THE INVENTION

Accordingly, it is an advantage of the present invention to provide a liquid crystal display device and a fabricating method thereof wherein the liquid crystal display device is driven with a magnetic field, thereby improving an aperture ratio as well as realizing a wide viewing angle.

In order to achieve these and other advantages of the invention, a liquid crystal display device according to one aspect of the present invention includes a first electrode to which a current is fed in a first direction; a second electrode to which a current is fed in a second direction; and a liquid crystal layer driven with a magnetic field induced by the current to of the first and second electrodes modulating a light.

A method of driving a liquid crystal display device according to another aspect of the present invention includes applying a current to a first electrode in a first direction; applying a current to a second electrode in a second direction; and driving a liquid crystal layer using a magnetic field induced by the current of the first and second electrodes modulating a light.

BRIEF DESCRIPTION OF THE DRAWINGS

These and other advantages of the invention will be apparent from the following detailed description of the embodiments of the present invention with reference to the accompanying drawings, in which.

DETAILED DESCRIPTION OF THE ILLUSTRATED EMBODIMENTS

Reference will now be made in detail to embodiments of the present invention, examples of which are illustrated in the accompanying drawings.

Hereinafter, the embodiments of the present invention will be described in detail with reference to FIGS. 3 to 6.

Figure 1A:
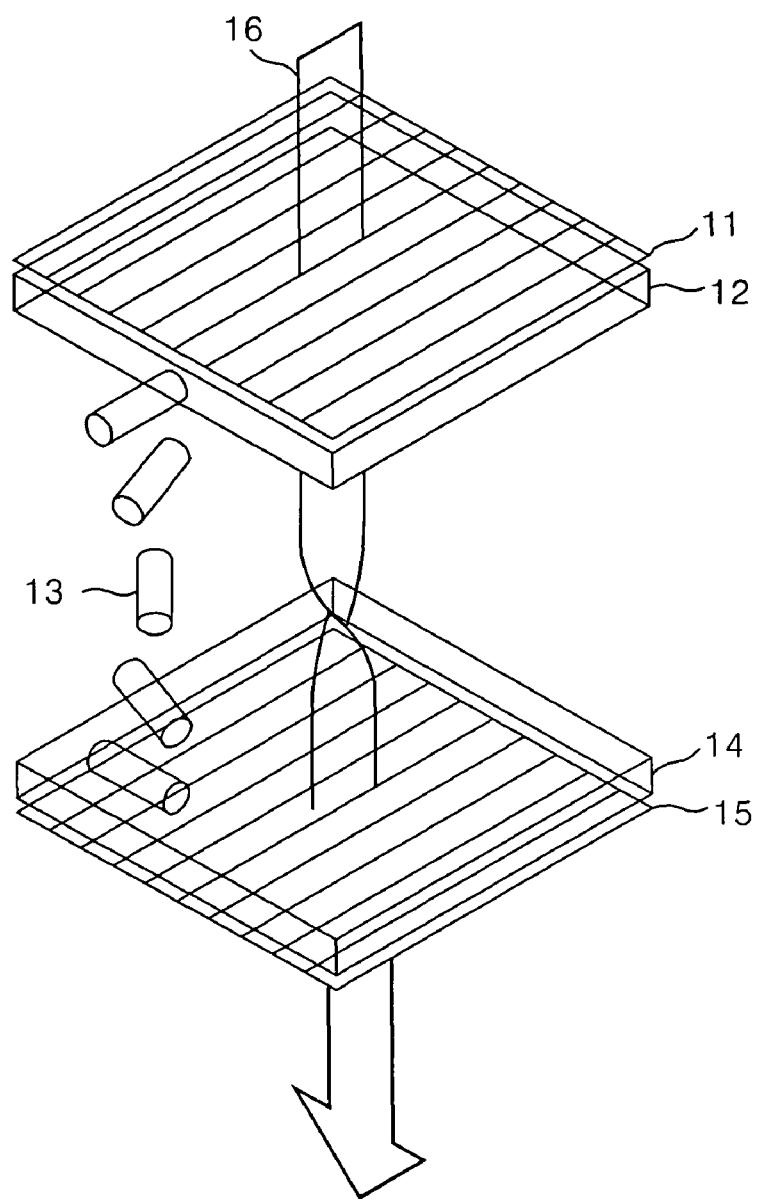
FIG. 1A and FIG. 1B illustrate a twisted nematic mode liquid crystal display.
Figure 1B:
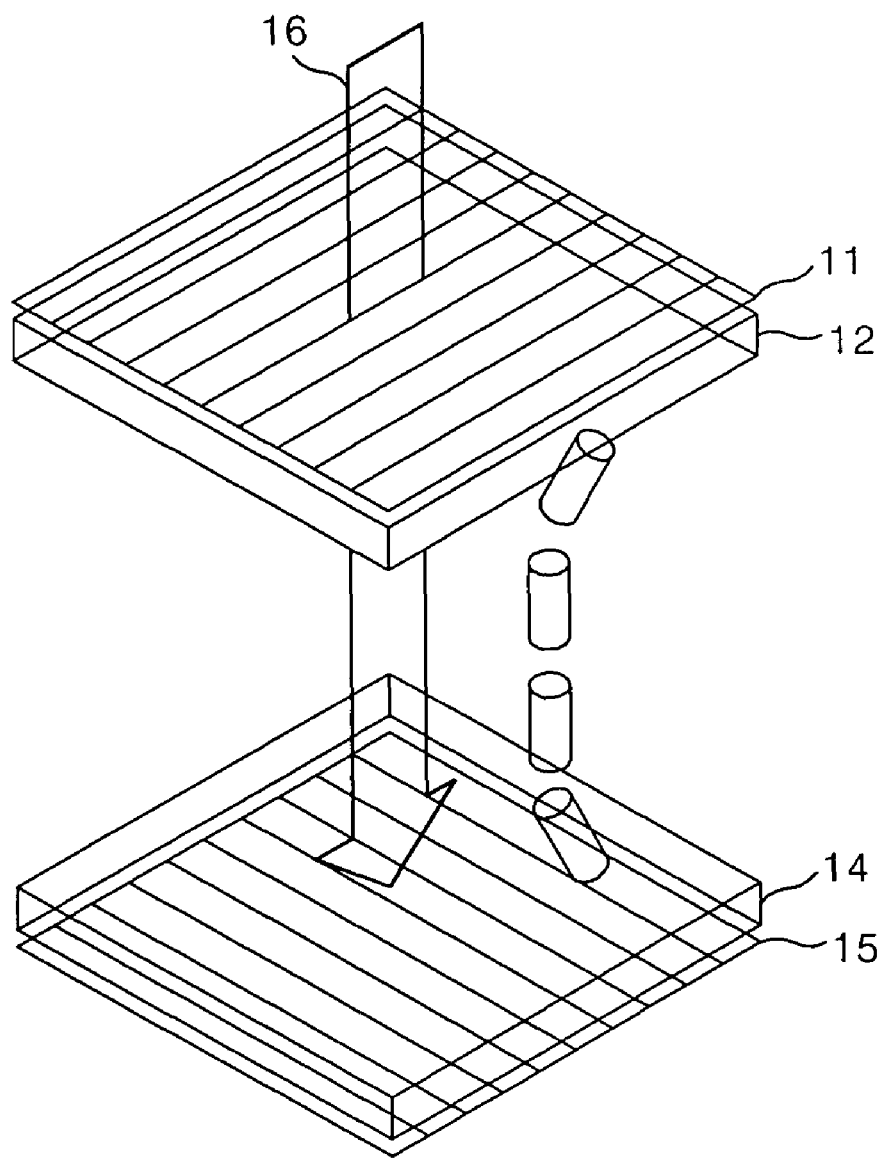
Figure 2:
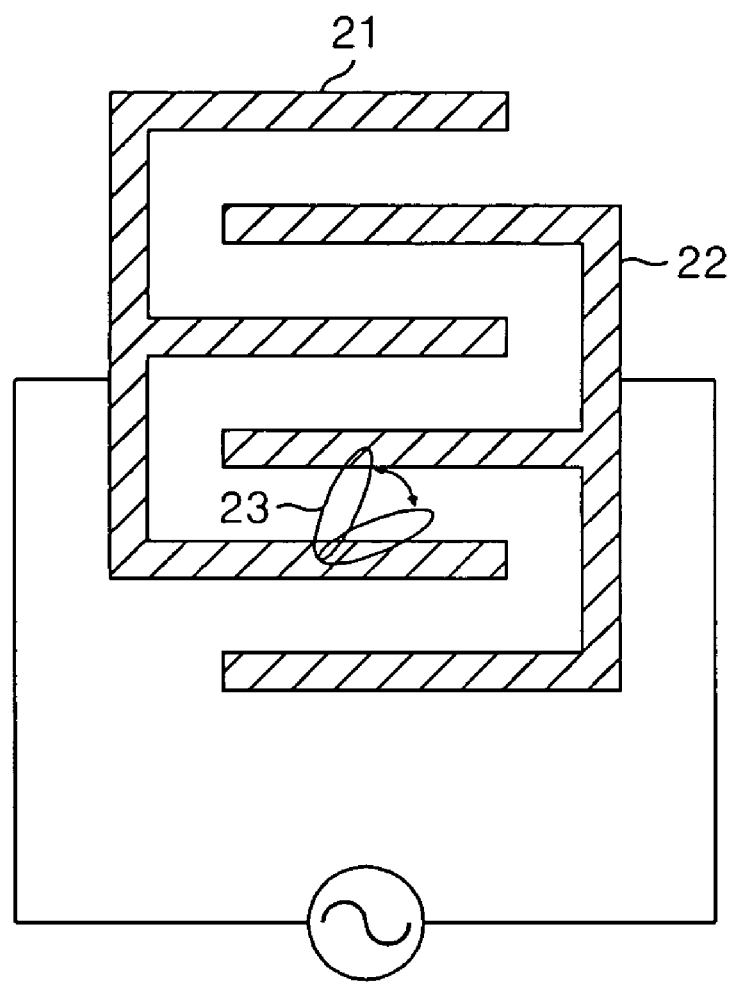
FIG. 2 depicts an in plane switching mode liquid crystal display.
Figure 3:
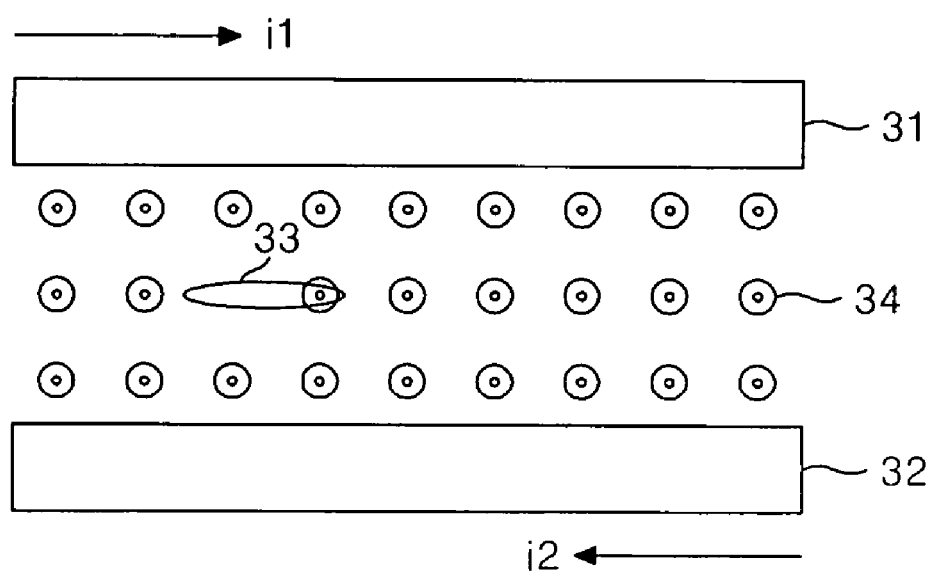
FIG. 3 illustrates a liquid crystal display device according to a first embodiment of the present invention.

In FIG. 3, the liquid crystal display device according to a first embodiment of the present invention includes first and second electrodes 31, 32 opposed to each other and having a liquid crystal layer therebetween and flown by a different direction of currents i1 and i2.

If a different direction of currents i1 and i2 flow in the first and second electrodes 31, 32 then a magnetic field 34 is induced around the electrodes 31, 32. When a direction of the current is as shown in FIG. 3, the magnetic field 34 is formed in a direction entering vertically from the drawing. Then, liquid crystal molecules 33 receive a force in a direction substantially parallel to the direction of the magnetic field 34. Thus, the liquid crystal molecules 33 are driven with the magnetic field 34 to be rotated, thereby modulating a polarized component of a light transmitting a liquid crystal layer.

Figure 4:
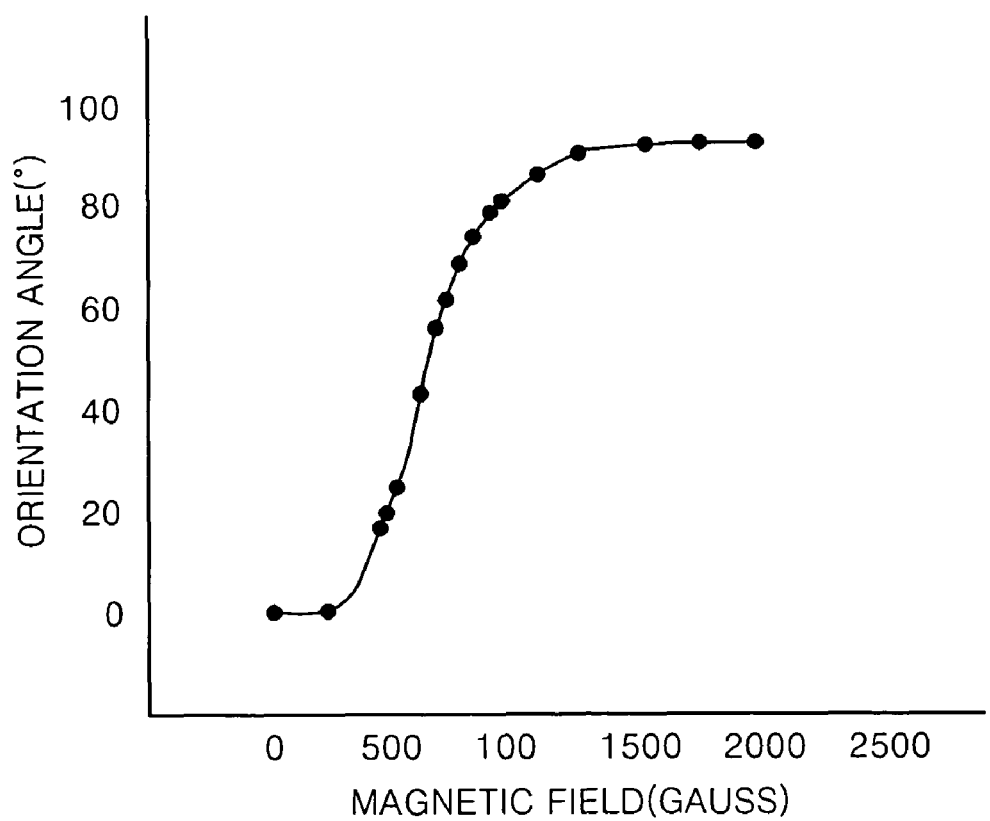
FIG. 4 is a graph representing a relationship of an orientation angle of a liquid crystal to a magnetic field.

A rotated orientation angle of the liquid crystal molecules 33 is differentiated based on an intensity of the magnetic field 34 as shown in FIG. 4. An experimental result of an orientation angle of the liquid crystal to a magnetic field has been disclosed by a paper of Y. Ji and J. R Kelly entitled "The Role of Surface Azimuthal Anchoring in the Electro-Optic Response of PLDC Films" at Pages 271 to 274, SID 95 DiGEST. As can be seen from FIG. 4, if the magnetic field 34 is controlled by adjusting the intensities of the currents i1 and i2 in accordance with a data, then an orientation angle of the liquid crystal molecules 33 and a gray level of a picture can be adjusted.

Figure 5:
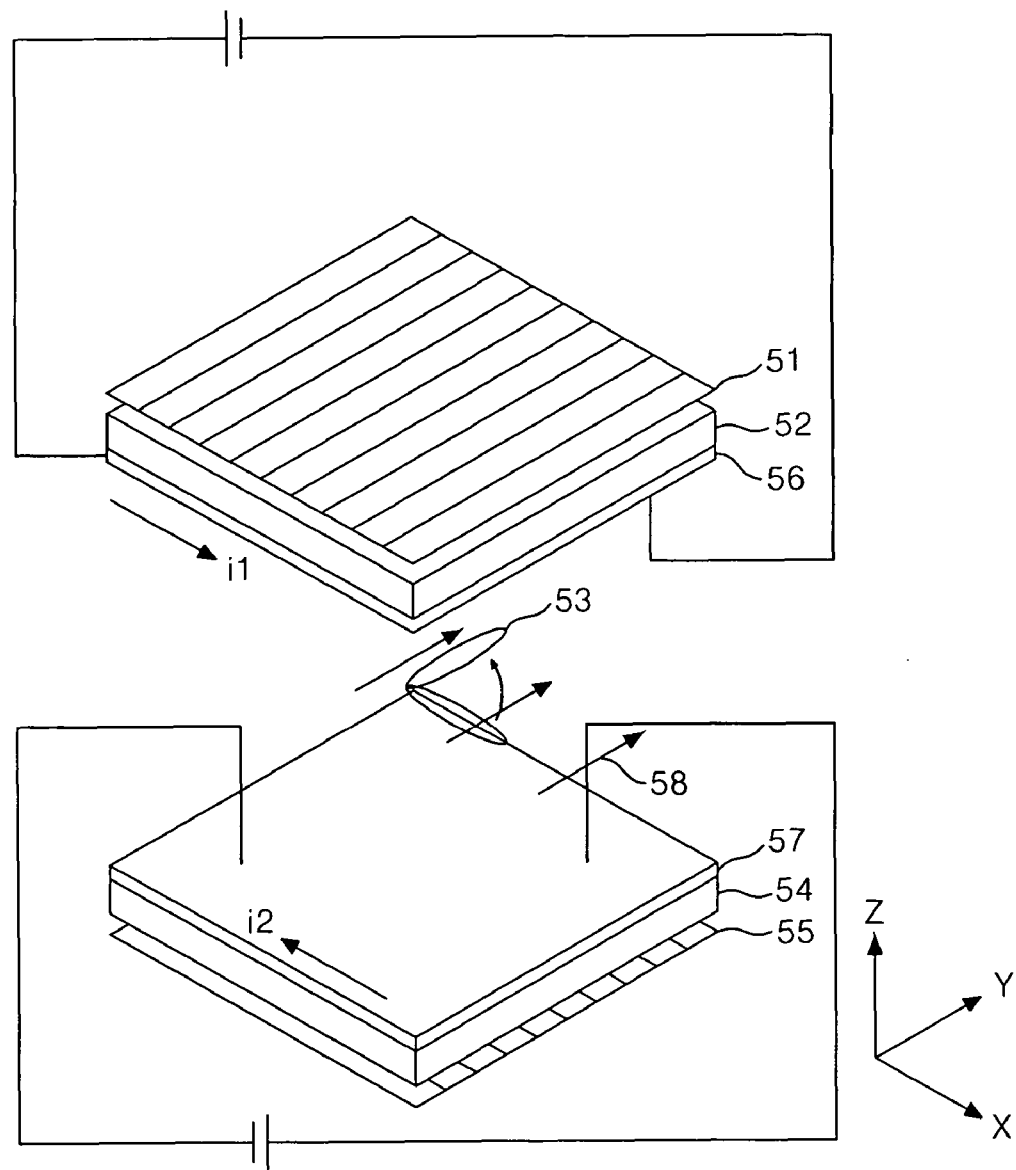
FIG. 5 illustrates a liquid crystal display device according to a second embodiment of the present invention.

FIG. 5 illustrates a liquid crystal display device according to a second embodiment of the present invention.

Referring to FIG. 5, the liquid crystal display device according to the second embodiment of the present invention includes an upper glass substrate 52 provided with an upper transparent electrode 56, a lower glass substrate 54 provided with a lower transparent electrode 57, and liquid crystal molecules 53 positioned between the upper glass substrate 52 and the lower glass substrate 54.

A voltage source is connected to the upper transparent electrode 56 such that a first direction of current i1 flows. On the other hand, a voltage source is connected to the lower transparent electrode 57 such that a second direction of current i2 flows.

Hereinafter, an operation of the liquid crystal display device in FIG. 5 will be described assuming a normally white mode.

During an active state in which currents i1 and i2 flow in the upper transparent electrode 56 and the lower transparent electrode 57, the liquid crystal molecules 53 have an orientation angle changed by a magnetic field 58 induced in a surface direction (or y direction) of the substrate. A light input to the liquid crystal layer via a lower polarizer 55, a lower glass substrate 54 and a lower transparent electrode 57 has a polarized component changed by the liquid crystal molecules 53 having an orientation angle changed in a direction of the magnetic field 58, thereby transmitting to an upper transparent electrode 56, an upper glass substrate 52 and an upper polarizer 51.

During an inactive state in which currents i1 and i2 do not flow in the upper transparent electrode 56 and the lower transparent electrode 57, the liquid crystal molecules 53 are not rotated because it does not receive any force. In this case, since a light being incident to the liquid crystal layer has a polarized component kept as it is, it can not go through the upper polarizer 51.

The liquid crystal molecules 53 in FIG. 5 are rotated in a direction of the induced magnetic field 58 formed in the surface direction of the substrate similar to the horizontal electric field system. Thus, the liquid crystal display device in FIG. 5 can realize a wide viewing angle and can improve an aperture ratio and a brightness by the upper/lower transparent electrodes 56 and 57.

Figure 6:
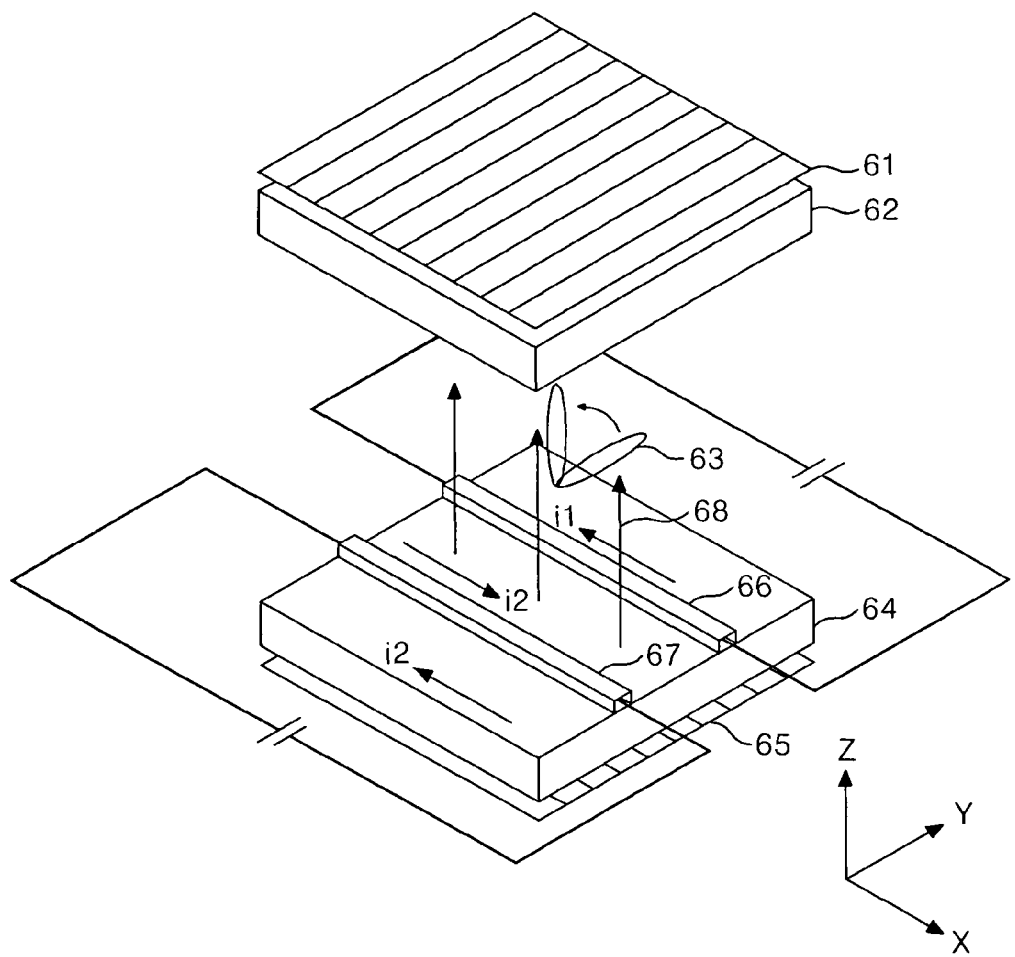
FIG. 6 illustrates a liquid crystal display device according to a third embodiment of the present invention.

FIG. 6 illustrates a liquid crystal display device according to a third embodiment of the present invention.

In FIG. 6, the liquid crystal display device according to the third embodiment of the present invention includes first and second electrodes 66 and 67 provided on a lower glass substrate 64, and liquid crystal molecules 63 positioned between an upper glass substrate 62 and the lower glass substrate 64.

The first and second electrodes 66 and 67 are formed from a transparent conductive material or a metal.

Polarizers 61 and 65 having light transmitting axes substantially perpendicular to each other are attached to the upper glass substrate 62 and the lower glass substrate 64.

A voltage source is connected to the first electrode 66 such that a first direction of current i1 flows. On the other hand, a voltage source is connected to the second electrode 67 such that a second direction of current i2 flows.

Hereinafter, an operation of the liquid crystal display device in FIG. 6 will be described assuming a normally white mode.

During an active state in which a different direction of currents i1 and i2 flows in the first and second electrodes 66 and 67, the liquid crystal molecules 63 have an orientation angle changed by a magnetic field 68 induced in a thickness direction (or z direction) of the substrate. A light incident to the liquid crystal layer via a lower polarizer 65 and a lower glass substrate 64 has a polarized component changed by the liquid crystal molecules 63 having an orientation angle changed in a direction of the magnetic field 68, thereby transmitting to the upper glass substrate 62 and the upper polarizer 61.

During an inactive state in which the currents i1 and i2 do not flow in the first and second electrodes 66 and 67, the liquid crystal molecules 63 are not rotated because they do not receive any force. In this case, since a light incident to the liquid crystal layer has a polarized component kept as it is, it can not go through the upper polarizer 61.

The liquid crystal molecules 63 in FIG. 6 are rotated in a direction of the induced magnetic field 68 formed in the thickness direction of the substrate similar to a vertical electric field system.

In the liquid crystal display device and the driving method thereof according to any one of the embodiments of the present invention, an alternating current voltage source may be connected to each electrode of FIG. 5 and FIG. 6 such that the polarities of the currents can be inverted for each frame interval.

Meanwhile, the liquid crystal layer in the liquid crystal display device according to the embodiment may be formed from any well-known liquid crystal material. Also, it is not mixed with an additional magnetic material.

As described above, according to the present invention, a magnetic field is induced between opposite electrodes by supplying a current to each of the opposite electrodes and differentiating a direction of the current, thereby driving the liquid crystal by the magnetic field. If the opposite electrodes are provided at different substrates, then the induced magnetic field is formed in the surface direction of the substrate and the liquid crystal is driven in the direction of the magnetic field, so that the liquid crystal can be driven by the in plane switching system. Accordingly, the opposite electrodes are formed from a transparent electrode and the magnetic field is formed in the surface direction of the substrate to make an in plane switching driving of the liquid crystal, thereby improving an aperture ratio as well as realizing a wide viewing angle. Furthermore, according to the present invention, the opposite electrodes may be provided at one substrate and an opposite direction of currents flow in the electrodes, thereby driving the liquid crystal similar to the vertical electric field system.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A liquid crystal display device, comprising:
   a first electrode on a substrate to which a first current is fed in a first direction;
   a second electrode on the substrate and separate from the first electrode to which a second current is fed in a second direction substantially opposite to the first direction;
   a liquid crystal layer driven with a driving magnetic field induced by the first current and the second current of the first and second electrodes for modulating a light;
   a polarizer on the substrate; and
   an alternating current voltage source, wherein polarities of the current of the first and second electrodes are inverted for each frame interval,
   wherein a first magnetic field generated by the first current and a second magnetic field generated by the second current each have a magnetic field component in the thickness direction of the substrate in the liquid crystal layer having the same direction that in combination form the driving magnetic field such that liquid crystal molecules of the liquid crystal layer are rotated in the thickness direction in a vertical switching mode,
   wherein at least one of the first and second electrodes is a transparent electrode,
   wherein the light to the liquid crystal layer via the polarizer and the substrate has a polarized component changed by the liquid crystal molecules having an orientation angle,
   wherein the liquid crystal molecules are rotated in a direction of an induced magnetic field formed in the thickness direction of the substrate similar to an electric field system, and wherein the first electrode and the second electrode are disposed in a transmittance region of the substrate.

2. The liquid crystal display device according to claim 1, wherein each of the first and second electrodes is a transparent electrode.

3. A method of driving a liquid crystal display device, comprising:
   applying a first current to a first electrode on a substrate in a first direction;
   applying a second current to a second electrode on the substrate and separate from the first electrode in a second direction substantially opposite to the first direction; and
   driving a liquid crystal layer with a driving magnetic field induced by the first current and the second current from the first and second electrodes modulating a light,
   wherein a first magnetic field generated by the first current and a second magnetic field generated by the second current each have a magnetic field component in the thickness direction of the substrate in the liquid crystal layer having the same direction that in combination form the driving magnetic field such that the liquid crystal molecules of the liquid crystal layer are rotated in the thickness direction in a vertical switching mode,
   wherein a polarizer is disposed on the substrate,
   wherein at least one of the first and second electrodes is a transparent electrode,
   wherein the light to the liquid crystal layer via the polarizer and the substrate has a polarized component changed by the liquid crystal molecules having an orientation angle,
   wherein the liquid crystal molecules are rotated in a direction of the induced driving magnetic field formed in the thickness direction of the substrate similar to a vertical electric field system,
   wherein the first electrode and the second electrode are disposed in a transmittance region of the substrate, and
   wherein polarities of the currents to the first and second electrodes are inverted for each frame interval.

4. The method according to claim 3, wherein each of the first and second electrodes is a transparent electrode.

* * * * *